United States Patent
Svanberg et al.

(10) Patent No.: US 6,681,615 B1
(45) Date of Patent: Jan. 27, 2004

(54) PORTABLE DIGITAL OXYGEN LEAK DETECTOR

(75) Inventors: Christian R. Svanberg, Coral Springs, FL (US); John C. Jones, Sunrise, FL (US)

(73) Assignee: ACR Electronics, Inc., Fort Lauderdale, FL (US)

( * ) Notice: Subject to any disclaimer, the term of this patent is extended or adjusted under 35 U.S.C. 154(b) by 0 days.

(21) Appl. No.: 10/064,123

(22) Filed: Jun. 13, 2002

Related U.S. Application Data

(60) Provisional application No. 60/298,294, filed on Jun. 14, 2001.

(51) Int. Cl.[7] ................................................. G01M 3/04
(52) U.S. Cl. .............................. 73/49.2; 73/40; 73/49.1
(58) Field of Search ........................... 73/40, 49.1, 49.2

(56) References Cited

U.S. PATENT DOCUMENTS

| | | | | |
|---|---|---|---|---|
| 2,345,387 A | * | 3/1944 | Elsey | 73/40 |
| 2,457,713 A | * | 12/1948 | Osborne | 73/40 |
| 2,961,868 A | * | 11/1960 | Hooper | 73/40 |
| 2,981,095 A | * | 4/1961 | Eshbaugh | 73/40 |
| 3,035,436 A | * | 5/1962 | Johnson | 73/40 |
| 3,221,540 A | * | 12/1965 | Kilbourn | 73/49.1 |
| 3,457,775 A | * | 7/1969 | Hinderer et al. | 73/40 |
| 5,201,213 A | * | 4/1993 | Henning | 73/49.2 |
| 6,116,082 A | * | 9/2000 | Pride | 73/40.5 R |

* cited by examiner

Primary Examiner—Michael Cygan
(74) Attorney, Agent, or Firm—Malin, Haley & DiMaggio, P.A.

(57) ABSTRACT

An oxygen leakage regulator tester to test for air leaks in $O_2$ supply equipment, such as oxygen masks and hoses used by flight personnel. The tester uses electromechanical sensors and a central processing unit, coupled to digital displays for accurate readouts.

8 Claims, 3 Drawing Sheets

PORTABLE DIGITAL OXYGEN LEAK DETECTOR

BACKGROUND OF THE INVENTION

1. Field of the Invention

The present invention relates generally to a machine for detecting leaks in an oxygen supply system, and specifically to an oxygen leakage regulator tester for testing leakage of oxygen regulators in oxygen supply equipment that uses a digital display.

2. Description of Related Art

It is well known that the partial pressure of oxygen in the atmosphere decreases with altitude. For this reason it is necessary in high altitude aircraft in order to prevent hypoxia at high altitudes to supply aircraft personnel with oxygen through an oxygen regulator including an oxygen mask and supply tube. Oxygen supply regulators in military jet aircraft provide the pilot and the crew with oxygen via breathing masks connected by a pipeline system to a centralized oxygen system. Oxygen regulator supply leaks can be harmful to the user, reduce available supply, and can create a hazardous environment. Therefore, it is necessary to test the oxygen regulating systems used in aircraft for leakage to ensure reliability and operability.

A conventional, portable analog tester for leakage detection comprises an air pump attached to an analog pressure gauge having an outlet tube connected to the device to be tested. The air pump is used to pump air into the device to be tested until pressure of a predetermined level is attained which is measured using the pressure gauge. Leakage in the system is determined by monitoring the analog pressure gauge for a drop in pressure per unit time or an analog flow meter. Typically, these devices cannot be calibrated to compensate for ambient air pressure or temperature. This type device is not always accurate in indicating leakage, given the inaccuracies of analog pressure gauges and the potential for error in reading the gauge. Analog devices are subject to ambient atmospheric pressure variations, resulting in inaccurate readings. Gas leakage in a relatively low-pressure system can often be hard to detect through visual inspection without test equipment.

Gas leak detectors are known in the prior are. U.S. Pat. No. 4,670,847 to Furuse teaches highly sophisticated equipment which bases its measurements on input reference values and computer analysis of results obtained from a sensor. Circuitry in this invention is not activated by a pressure sensor. Also, U.S. Pat. No. 4,998,434 to Asbra teaches permanently coupled equipment for testing a housing line without a manipulable pressure reservoir. In addition, U.S. Pat. No. 4,775,855 to Cox teaches a leakage detection system adapted for transportation systems such as hoses for primary and secondary fluids, such as those used in the transportation of petroleum products. U.S. Pat. No. 4,350,038 to Soncrant illustrates a machine that accepts or rejects hollow devices using pressurized air and three separate regulators of the prior art teaches a portable leak detector which is highly accurate for low pressures.

None of the prior art teaches a leak detector which has a reservoir volume for use during testing which is hand manipulable.

None of the prior art teaches a power efficient leak detector which does not use power from its power supply until it is activated manually, and is simple to operate, inexpensive to manufacture and easy to read.

Therefore, what is required is a specialized gas leakage detector for use in testing flight crew oxygen regulating equipment with little potential for error in determining the presence of leakage, which is sensitive in measuring relatively low pressures as well as fluid flow.

SUMMARY OF THE INVENTION

An oxygen leakage regulator tester for testing pilot and air crew oxygen equipment, including oxygen masks and oxygen supply hoses conventionally used aboard aircraft, allowing the expedient and accurate detection of gas leakage with high accuracy using electronic air flow sensors and a digital display.

The portable tester includes a hand-operated air pump, a pressure reservoir, an electronic air flow sensor, a plug and tube connected to the air reservoir for connection to a mask or hose, an air release valve, an electronic air pressure air sensor, a central processing unit, an LCD air pressure display, an LCD air flow display, an air pressure activated switch for turning the unit on and off, a carrying enclosure, and a battery power supply. The tester is engaged to a mask hose to be tested with the plug. The hand pump is used to increase air pressure in the mask up to 17 inches of water. Once the system is pressured, the LCD display is watched for air pressure and air flow rate. If the airflow rate is above 0.25 $cm^3$/minute, then a leak is detected.

The hand air pump is comprised of a squeezable rubber bulb with two one-way valves installed within. When the bulb is compressed, air is forced out of the first end of the bulb and when released, air is drawn in through the second end, refilling the bulb. The first end of the bulb is connected to an air release valve and one end of the pressure reservoir by suitable tubing. The air reservoir is a bladder that maintains a volume of air at the working air pressure for a working supply of high-pressure air during the test.

The hand pump, air release valve, pressure reservoir, electronic air pressure and air flow sensors and air pressure switch are connected in fluid communication in-line, using suitable sealed tubing. The LCD air pressure and flow displays, electronic pressure and flow sensors, air pressure switch, and central processing unit are mounted within a portable housing or case which is formed by an elongated box having a lid and a handle. The housing also encloses the battery power supply.

The air pressure switch, battery power supply and central processing unit are electrically connected so that when the air pressure reaches a preset level in the test tube, the electrical switch is closed, and the central processing unit is supplied with operating power. The air pressure and flow displays are mounted visibly within the housing so that when the lid is open the gauges are viewable by the user. When the lid is closed, the gauges are protected from damage due to handling. The housing is portable and contained in a brief case sized box with an openable lid and a carrying handle.

The housing is sized for storing the hand pump, pressure reservoir and test operational air supply tubing when not in use. The aircraft oxygen supply system including mask and $O_2$ supply hose to be tested is connected in-line to the plug end of the test tube. The hand pump is used to create increased air pressure (17 inches) within the mask hose or hose being tested from the high-pressure air in the reservoir. The air pressure switch closes the circuit between the central processing unit and the battery power supply, giving the central processing unit and LCD displays operating power. Fluid pressure and airflow can then be observed by reading the LCD pressure and flow displays. Leakage can be determined if the air flow display quantified air flow LCD reading exceeds an acceptable predetermined limit, such as 0.25 cm$_3$/minute.

It is an object of this invention to provide an accurate, easy-to-read air leakage detector used for testing oxygen supply equipment which measures test air pressure and air fluid flow utilizing LCD displays while testing the actual equipment.

It is a further object of this invention to provide a leakage detector which is accurate for low leakage flow rates.

In accordance with these and other objects which will become apparent hereinafter, the instant invention will now be described with particular reference to the accompanying drawings.

DETAILED DESCRIPTION

Figure 1:
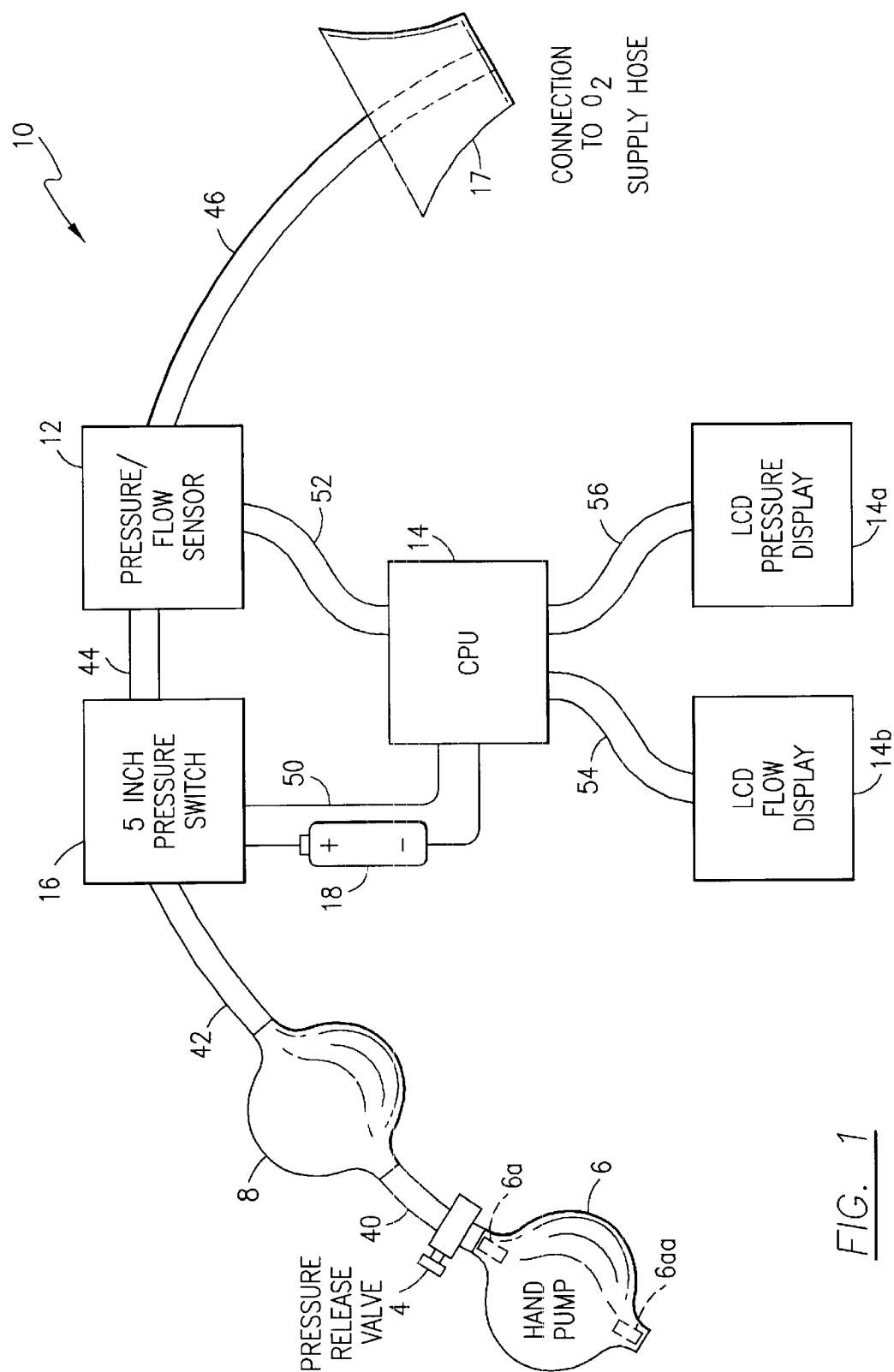
FIG. 1 shows a schematic diagram of the invention.

Referring to FIG. 1, the general functional elements of the invention are shown. Oxygen leakage regulator tester 10 includes flexible, squeezable, hand air pump 6 for creating air pressure during testing, an expandable pressure reservoir bladder 8, air release valve 4 for adjusting the pressure being tested or releasing the pressure when testing is complete, electronic air pressure and flow sensor 12, central processing unit (CPU) 14, digital LCD air pressure display 14a, digital LCD flow display 14b, a battery power supply 18 and a portable housing 22 (shown in FIG. 2). Suitable tubing with a rubber stopper 17 having an aperture is used to connect the tester 10 to the flight personnel oxygen supply equipment such as a mask or hose to be tested.

Hand air pump 6 is formed by a flexible rubber bulb having an air inlet and an air outlet from two one-way air flow valves 6a and 6aa installed within so that when the bulb is manually compressed, air is forced out of the first end valve 6aa (outlet) of the bulb and when released the bulb draws air in through the second end valve 6a (inlet), refilling the bulb. Hand pump 6 is connected in fluid connection to air release valve 4 which may be opened and closed by the user so that the pressure being created by hand pump 6 may be adjusted or dumped. Pressure reservoir 8 is constructed of a flexible material such as rubber which expands as pressure increases thereby increasing the volume of air within the testing system. Reservoir 8 may be hand manipulated (squeezed) during testing to maintain adequate air pressure in the equipment being tested should air pressure quantities drop due to leakage.

Electronic transducer air pressure and air flow sensor 12 is of the conventional type, such as that produced by Alicat, Inc., that electromechanically measures air pressure in inches of water and air flow in liters per minute. Sensor 12 sends digital signals through connector 52 to Central Processing Unit 14. Central Processing Unit 14 is of the conventional type that interprets the signals from air pressure and air flow sensor 12 and displays the quantitative amounts or readings of the air pressure and air flow sensor 12 separately through LCD pressure display 14a and LCD flow display 14b. Test air pressure is predetermined and in one example is 17 inches of water. In this example a leak would be considered at 0.25 liters of air flow per minute.

The tester turns on and off automatically. Air pressure switch 16 is electrically connected to battery power source 18 and Central Processing Unit 14 so that when the air pressure in the system is pumped up to a threshold value, air pressure switch 16 is closed and Central Processing Unit 14 is supplied with operating power. When the oxygen supply equipment to be tested is connected to tester 10 via rubber stopper 17, hand air pump 6 is used to create pressure within the oxygen supply system equipment being tested, such as a mask hose. Air release valve 4 can be used to reduce or release the pressure within the system as required. Air pressure switch 16 is calibrated to close the circuit between central processing unit 14 and battery power supply 18 upon encountering a pressure of 5 inches barometric water pressure thus supplying central processing unit 14 with operating power. Air pressure switch 16 may be calibrated to close the circuit at any suitable pressure. Pressure reservoir 8 serves to, allow manual squeezing to increase or sustain the air pressure within the system by increasing the volume of air contained in the system being tested. The air pressure held by the tester and equipment tested and the airflow (leakage if present) can be easily observed by reading the measurements displayed by LCD pressure display 14a and LCD flow display 14b. Leakage within the equipment being tested can be determined if the air flow exceeds a predetermined limit, for example 0.25 liters per minute.

Figure 2:
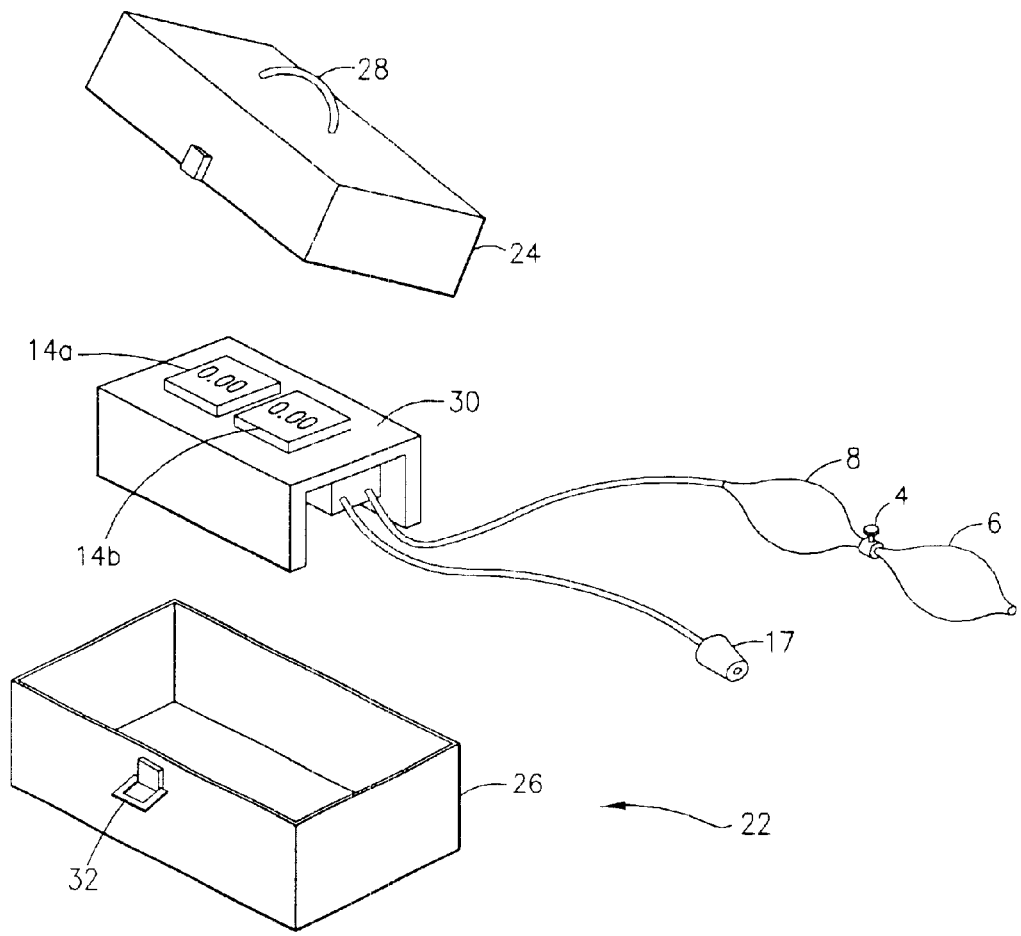
FIG. 2 shows an exploded view in perspective of the invention.

Referring to FIG. 2, electronic air pressure and air flow sensor 12, air pressure switch 16, central processing unit 14, LCD pressure display 14a and LCD flow display 14b are mounted within a portable, box-shaped housing 22 having a closeable hinged lid 24, a base 26, a handle 28, a mounting plate 30 and a closure latch 32. The base 26 and lid 24 are preferably attached by a hinge allowing lid 24 to pivot open and close. Closure latch 32 is attached to base 26 and lid 24 so that lid 24 may be secured in the closed position by locking latch 32, or other known equivalent securing devices. Handle 28 is attached to the top of lid 24 for ease of transporting apparatus 10 and may be flush mounted. The housing 22 and the closing devices may be constructed of metal, plastic, resin or any other suitable rigid material.

Figure 3:
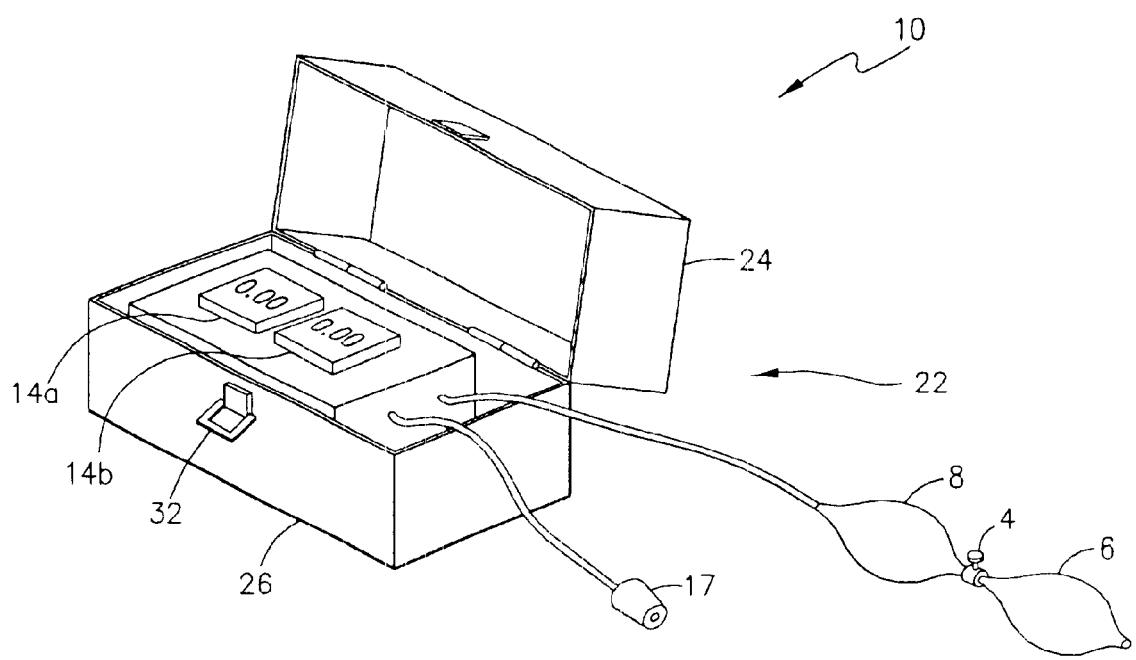
FIG. 3 is a perspective view of the invention.

Electronic air pressure and air flow sensor 12, air pressure switch 16 and central processing unit 14 (not seen in FIGS. 2 & 3) are preferably attached to the underside of mounting plate 30 which is enclosed within base 26 of enclosure housing 22. LCD pressure display 14a and LCD flow display 14b are mounted to mounting plate 30. When lid 24 is open LCD pressure display 14a and LCD flow display 14b are viewable by the user, while electronic air pressure and air flow sensor 12, air pressure switch 16 and central processing unit 14 are concealed from view as seen in FIG. 3.

A power supply such as battery 18 (not shown) is detachably affixed within base 26 using straps, hook and loop fasteners or any other suitable detachable fasteners. When lid 24 is closed, LCD pressure display 14a and LCD flow display 14b are protected from possible damage due to handling and transport. The lid 24 may be secured in the closed position by latch 32. Hand air pump 6, air release valve 4, pressure reservoir 8, rubber stopper 17 and the attached tubing can be stored within enclosure housing 22 when not in use.

To operate the present invention, as an example, an oxygen mask that includes a regulator and flexible hose is tested. Referring to FIG. 1, the hose end of the oxygen mask is connected in a sealable manner to plug 17. The operator then squeezes hand pump 6 with the pressure release valve 4 being open, causing air pressure to increase in reservoir 8. Once the pressure reaches a threshold value through tube 42 of approximately 5 inches of water, the pressure-activated switch 16 turns on power to the CPU 14, activating LCD pressure display 14a and flow display 14b. Air pressure also increases in tube 44 and in pressure and flow sensor 12. Flow sensor 12 is connected electrically to CPU 14 and provides digital information to the CPU, which is then used and processed to provide a readable, digital display in the LCD pressure display 14a and the LCD flow display 14b, which is critical to the test. LCD 14b is connected to the CPU by wiring 56, and LCD 14a is connected to the CPU by wiring 54. A threshold air pressure is utilized for system operation, such as 17 inches of water which is created using hand air pump 6 and read on the LCD pressure display 14a. Once the threshold operating value is achieved, a time element is selected and LCD airflow display 14b is observed. If, after a few minutes, the indication is that there is zero or less than 0.25 liters per minute of flow, it is believed that the mask being tested is operating satisfactorily.

The oxygen mask hose is then detached from plug 17. Air pressure in the system may be further released by the air pressure release valve 4 connected to hand pump 6. Once the air pressure in the pressure switch 16 drops below 5 inches, the system will electrically turn off through wiring 50 to CPU 14.

The use of a digital display for airflow leak detection in air pressure, in conjunction with electronic transducers that provide digital information with a CPU, greatly enhances the accuracy of the portable system.

The instant invention has been shown and described herein in what is considered to be the most practical and preferred embodiment. It is recognized, however, that departures may be made therefrom within the scope of the invention and that obvious modifications will occur to a person skilled in the art.

What is claimed is:

1. An energy efficient, easy to read, portable digital gas leak detector for testing air leakage in oxygen supply equipment comprising:

means for introducing pressurized gas into said equipment in fluid communication with said equipment;

means for manually manipulating the pressure of the gas introduced into said equipment in fluid communication with said means for introducing pressurized gas;

means for measuring said pressure and leakage of said introduced gas in said equipment in fluid communication with said means for introducing pressurized gas; and means for displaying said pressure and said leakage in electronic communication with said means for measuring said pressure and said leakage;

said means for displaying said pressure and said leakage includes an LCD pressure display and an LCD flow display each in electronic communication with a central processing unit (CPU);

a power supply in electronic communication with the CPU; and a pressure switch in electronic communication with the CPU, whereby the power supply is only engaged to the CPU at or above a predetermined gas pressure.

2. The detector of claim 1, wherein the means for introducing pressurized gas includes a hand pump and a pressure release valve.

3. The detector of claim 1, wherein the means for manually manipulating the pressure includes a reservoir.

4. The detector of claim 3, wherein the reservoir is an inflatable bladder.

5. The detector of claim 1, wherein the means for measuring said pressure and leakage includes a pressure/flow sensor.

6. The detector of claim 1, including:

a portable housing; and a closeable lid.

7. An oxygen leakage regulator tester for testing air leakage in oxygen supply equipment that measures pressure and leakage flow digitally within said oxygen regulator comprising:

a central processing unit;

an electronic fluid air pressure and air flow sensor electrically connected to said central processing unit;

one or more LCD screens connected to said central processing unit which display air pressure and air flow within the oxygen system being tested;

an air pressure test source including a hand pump connected to a pressure reservoir and an air release valve connected to said reservoir;

a battery power supply;

an air pressure switch adapted to close at predetermined level of barometric water pressure, said air pressure switch connected to said central processing unit and said battery power supply;

a rubber stopper having an aperture, said rubber stopper adapted for sealably engaging the $O_2$ equipment to be tested;

said air pressure test source, said air pressure switch, said electronic fluid air pressure and air flow sensor and said rubber stopper connected in-line and in fluid connection using tubing;

a portable housing; said central processing unit, said LCD screens, said electronic fluid air pressure and air flow sensor, said air pressure switch and said battery power supply mounted within said housing.

8. An oxygen leakage regulator as in claim 7, mounted in a portable housing having a base and pivotally attached lid; said central processing unit, said LCD screens, said electronic fluid air pressure and air flow sensor, said air pressure switch and said battery power supply mounted within said base; said housing adapted to store said air pressure test source, said rubber stopper and said tubing when not in use.

* * * * *